(12) United States Patent
Chang

(10) Patent No.: US 8,091,374 B2
(45) Date of Patent: Jan. 10, 2012

(54) WEIGHING TYPE ICE VENDING MACHINE

(75) Inventor: Wei-Cheng Chang, Jhongli (TW)

(73) Assignee: Dongguan Jiafeng Mechanical Equipment Co., Ltd, Guangdong Province (CN)

( * ) Notice: Subject to any disclaimer, the term of this patent is extended or adjusted under 35 U.S.C. 154(b) by 525 days.

(21) Appl. No.: 12/388,564

(22) Filed: Feb. 19, 2009

(65) Prior Publication Data

US 2010/0205985 A1    Aug. 19, 2010

(51) Int. Cl.
*F25C 1/00*      (2006.01)
*F25C 5/00*      (2006.01)
*G07F 11/00*    (2006.01)

(52) U.S. Cl. .............. 62/137; 62/344; 62/381; 177/245; 221/2; 221/150 R

(58) Field of Classification Search .................... 62/137, 62/344, 381; 177/245; 221/2, 8, 150 R; 222/146.6
See application file for complete search history.

(56) References Cited

U.S. PATENT DOCUMENTS

| 3,151,668 | A  | * | 10/1964 | Zimmermann | 222/146.1 |
| 6,112,539 | A  | * | 9/2000  | Colberg    | 62/331    |
| 7,757,513 | B2 | * | 7/2010  | Paine      | 62/344    |
| 2007/0267093 | A1 | * | 11/2007 | Soderman | 141/82    |
| 2008/0283145 | A1 | * | 11/2008 | Maxwell  | 141/114   |
| 2010/0294618 | A1 | * | 11/2010 | Jennison | 194/350   |

* cited by examiner

*Primary Examiner* — Marc Norman
(74) *Attorney, Agent, or Firm* — Jackson IPG PLLC; Demian K. Jackson

(57) ABSTRACT

A weighing type ice vending machine includes an ice cube formation device installed in a machine body for supplying a specific weight of ice cubes after coins are inputted, and a body composed of a storage bucket, an output device, a weight sensing module and a control loop. Pure water is put into an ice tray in the machine body and condensed into ice cubes which are gathered into a storage bucket for a cold storage. A user puts a user's container on a weighing scale of the weight sensing module at an outlet of the machine body outlet and inserts coins whose dollar amount information is displayed. The quantity of outputted ice cubes is calculated and outputted automatically, and then the ice supply is stopped. The quantity of remained ice cubes in the machine body is recorded automatically, such that the ice cube will be produced again timely and the supply of ice cubes will be stopped temporarily.

5 Claims, 5 Drawing Sheets ent of a fourth preferred embodiment
WEIGHING TYPE ICE VENDING MACHINE

BACKGROUND OF THE INVENTION

1) Field of the Invention

The present invention relates to a weighing type ice vending machine, in particular to an ice vending machine having a weighing scale installed on a weight sensing module at a machine outlet and provided for a user to place a container. After the user inserts a coin or a number of coins into the vending machine, a quantity of ice cubes corresponding to the number of inputted coin(s) will be calculated and outputted, and the weight sensing module is used for calculating the total weight of the user's container and the corresponding quantity of ice cubes to achieve the effect of supplying ice cubes according to the dollar amount of the inputted coin(s).

2) Description of the Related Art

Automatic coin operated ice vending machine is available for consumers to purchase ice cubes. Since some of the ice vending machines require consumers to prepare a container on their own, or the machine body does not come with a proper design, consumers have no idea whether or not they have bought enough ice cubes, even though the ice cubes come out from the vending machine after consumers put in coins of a specific dollar amount. Since the output of ice cubes is calculated and controlled by a program loop in the machine body, there is no objective standard of determining the output quantity of ice cubes corresponding to the inputted coins displayed by the vending machine. Although there is an allowable tolerance, the error is very large, particularly if the mode of outputting ice cubes from the machine body is mechanical. Therefore, selling ice cubes by weight is a solution to overcome the aforementioned issue. Since the weight of a consumer's container used for containing the ice cubes varies each time, an error of the computation may result, and thus it is an important subject for this invention to solve the aforementioned problem.

SUMMARY OF THE INVENTION

In view of the shortcomings of the prior art, the inventor of the present invention based on years of experience in the related industry to conduct extensive researches and experiments, and finally developed a weighing type ice vending machine in accordance with the present invention to overcome the shortcomings of the prior art.

Therefore, it is a primary objective of the invention to provide a weighing type ice vending machine, comprising an ice cube formation device, a storage bucket, an output device, a weight sensing module, and a control loop installed in the machine body, such that after a plurality of ice cubes is produced and put into the storage bucket for a cold storage, and a user puts a user's container on a weighing scale of the weight sensing module at an outlet of the machine body, and a user inserts coins into the vending machine and the information of inputted coins is displayed, the corresponding quantity of ice cubes is calculated and outputted, and then the supply of ice cubes from the vending machine is stopped, and the quantity of remained ice cubes in the machine body is recorded automatically, such that the ice cubes can be produced again timely and automatically and the supply of ice cubes can be stopped temporarily. The weight sensing module is used for calculating the total weight of a user's container and a fixed quantity of ice cubes to achieve the effect of supplying ice cubes after coins are inputted.

Another objective of the present invention is to provide a weighing type ice vending machine, wherein the vane roller of the output device installed above the outlet of the storage bucket in the machine body, not only providing an effect of pushing the ice cubes, but also compressing the ice cubes to assure that the ice cubes are separated from each other, and prevent the plurality of ice cubes from being condensed into an aggregate of a large volume.

Another objective of the present invention is to provide a weighing type ice vending machine, wherein an output device is installed at the position of the outlet of the storage bucket in the machine body, and a vane roller is installed, and a catch plate and a weight block are disposed at the bottom of the vane roller for controlling the output of ice cubes, such that when a motor is turned on to start rotating the vane roller, the vane roller turns and moves the ice cubes to the catch plate, and the ice cubes will drop into the container if the weight of the catch plate is greater than the weight block at the other end, and the catch plate will be shut if the output of ice cubes completes.

Another objective of the present invention is to provide a weighing type ice vending machine, wherein the weight sensing module installed at the outlet of the machine body uses an electronic component for sensing weight.

Another objective of the present invention is to provide a weighing type ice vending machine, wherein the weight sensing module installed at the outlet of the machine body uses a mechanical component for sensing weight.

DETAILED DESCRIPTION OF THE PREFERRED EMBODIMENTS

Figure 1:
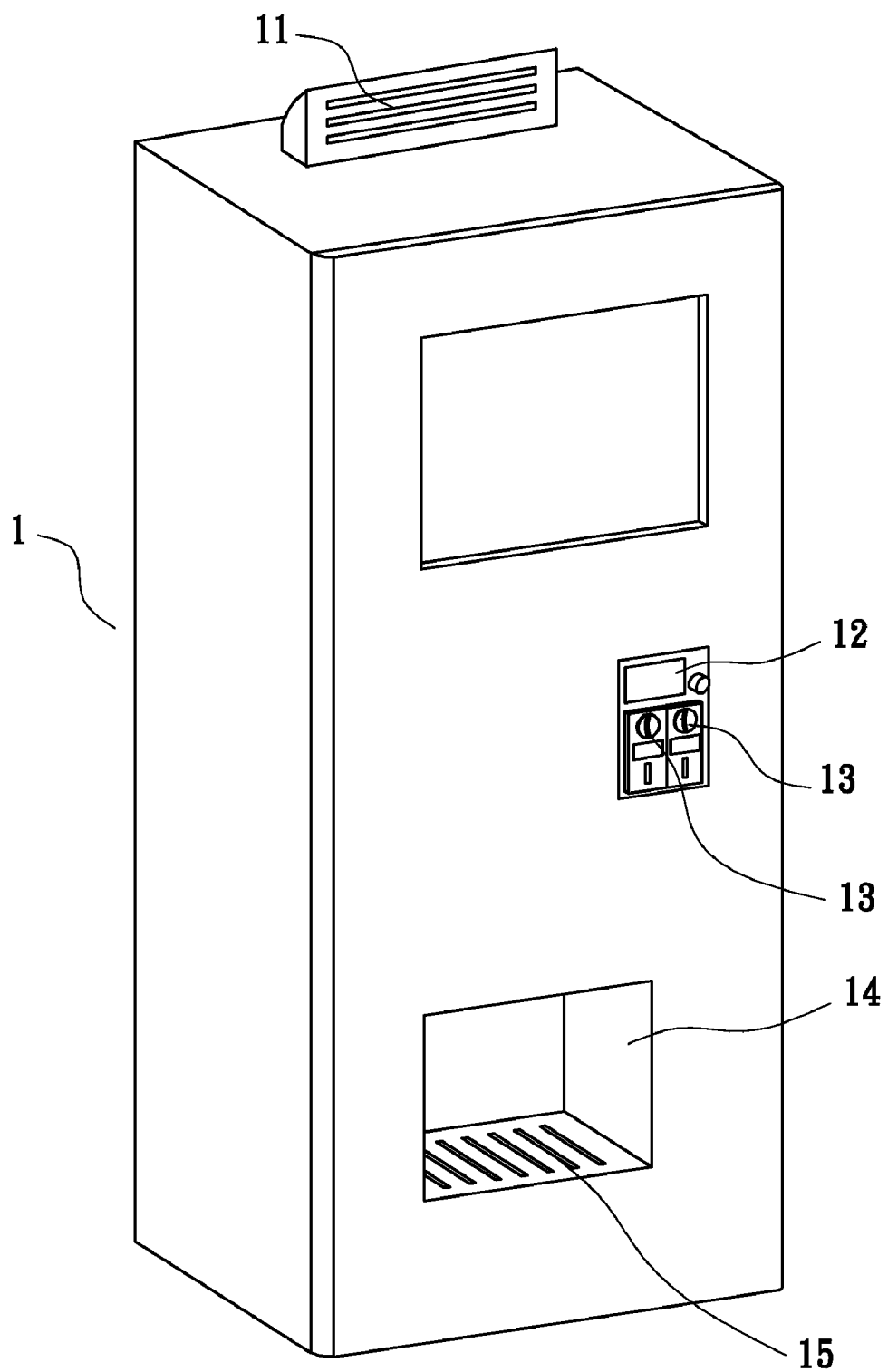
FIG. 1 is a perspective view of the invention.
Figure 2:
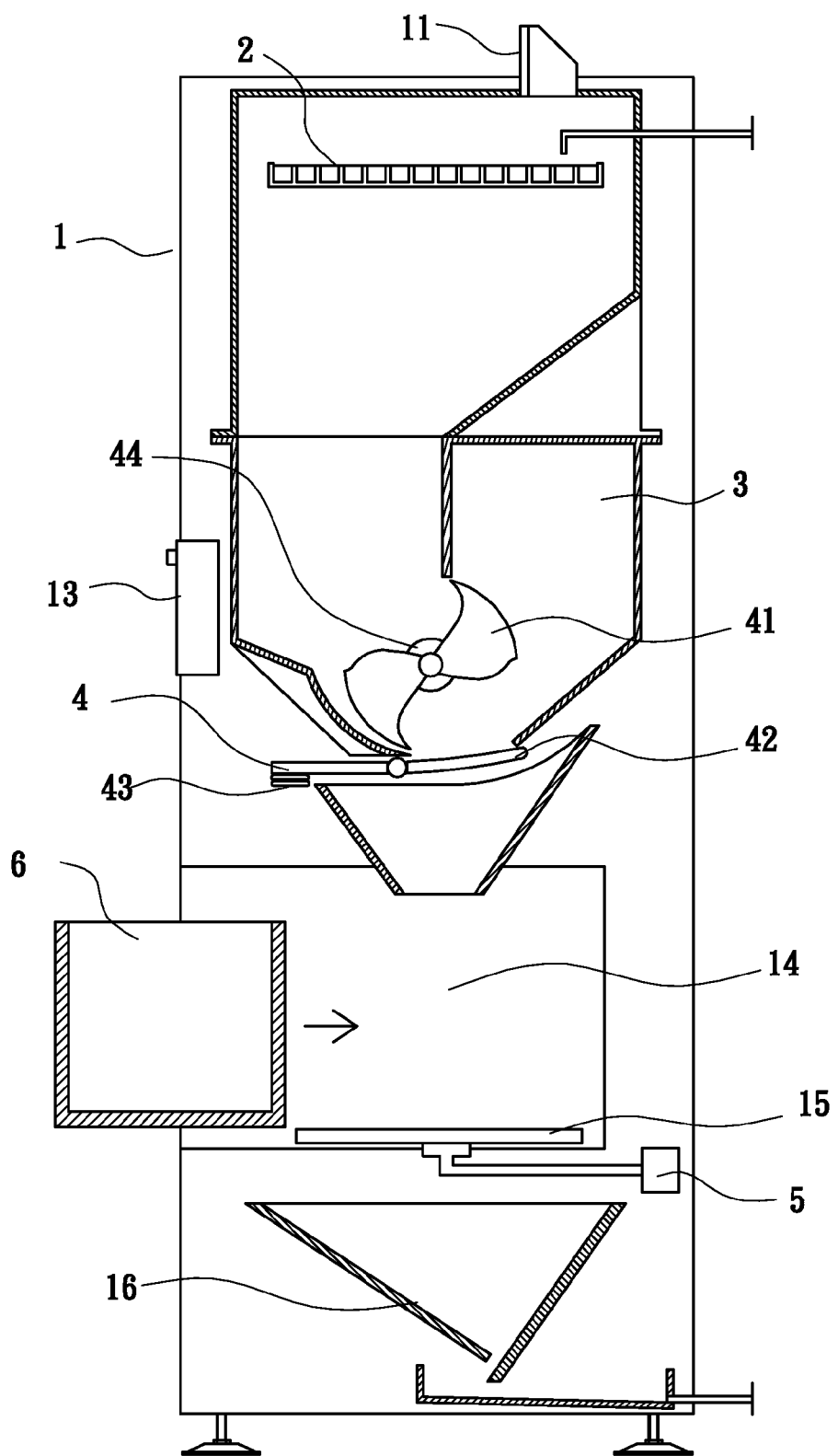
FIG. 2 is a cross-sectional view of the invention.
Figure 3:
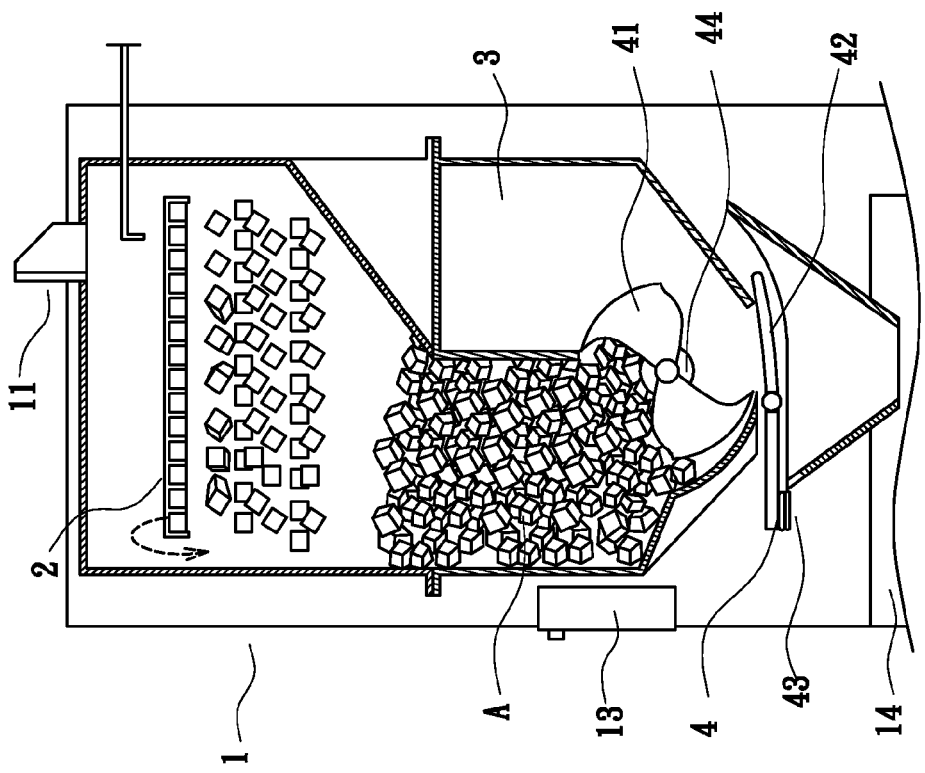
FIG. 3 is a schematic view of a first preferred embodiment of the invention.

With reference to FIGS. 1 and 2 for a weighing type ice vending machine of the present invention, a plurality of ice cubes A produced in the machine body 1 is gathered and stored in an ice bucket 3. After a user puts a specific amount of money into the vending machine, the vending machine will output a specific weight of ice cubes automatically. The external surface of the machine body 1 has a heat dissipating opening 11 for discharging hot air, and the front side of the vending machine has a display screen 12, a coin slot 13, an outlet 14 for putting a container 6 and receiving the supply of ice cubes A, a weighing scale 15 installed at the bottom of the outlet 14, wherein the bottom of the weighing scale 15 is connected to a weight sensing module 5, and an overflow water collecting tank 16 provided for preventing the machine body from being damaged by overflow water. The machine body 1 includes an ice cube formation device, a storage bucket 3, an output device 4, a weight sensing module 5, and a control loop, wherein after pure water is put into an ice tray made of metal and installed in the machine body 1 first, the water is condensed into small pieces of ice cubes A, and the ice cubes A are gathered and put into the storage bucket 3 for a cold storage (as shown in FIG. 3), and the ice bucket 3 is made of stainless steel, and insulation materials including polylon, insulating foam material and aluminum foil layer are wrapped around the circumferential surface of the external periphery of the ice bucket 3, and an output device 4 is installed at a position of the outlet of the storage bucket 3 in the machine body 1. In other words, a vane roller 41 is installed, and a catch plate 42 and a weight block 43 are installed at the bottom of the vane roller 41 for controlling the output of ice cubes, and the vane roller 41 is driven by a motor 44 to rotate, and the weight sensing module 5 is composed of a mechanical component (or a spring) or an electronic component for sensing weight.

Figure 4:
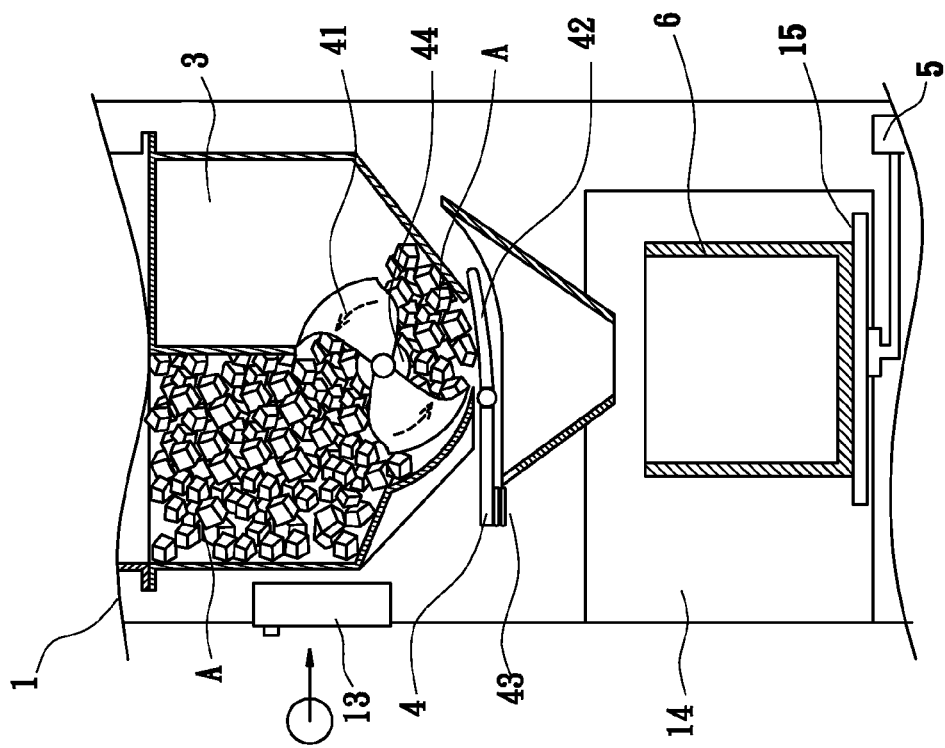
FIG. 4 is a schematic view of a second preferred embodiment of the invention.
Figure 5:
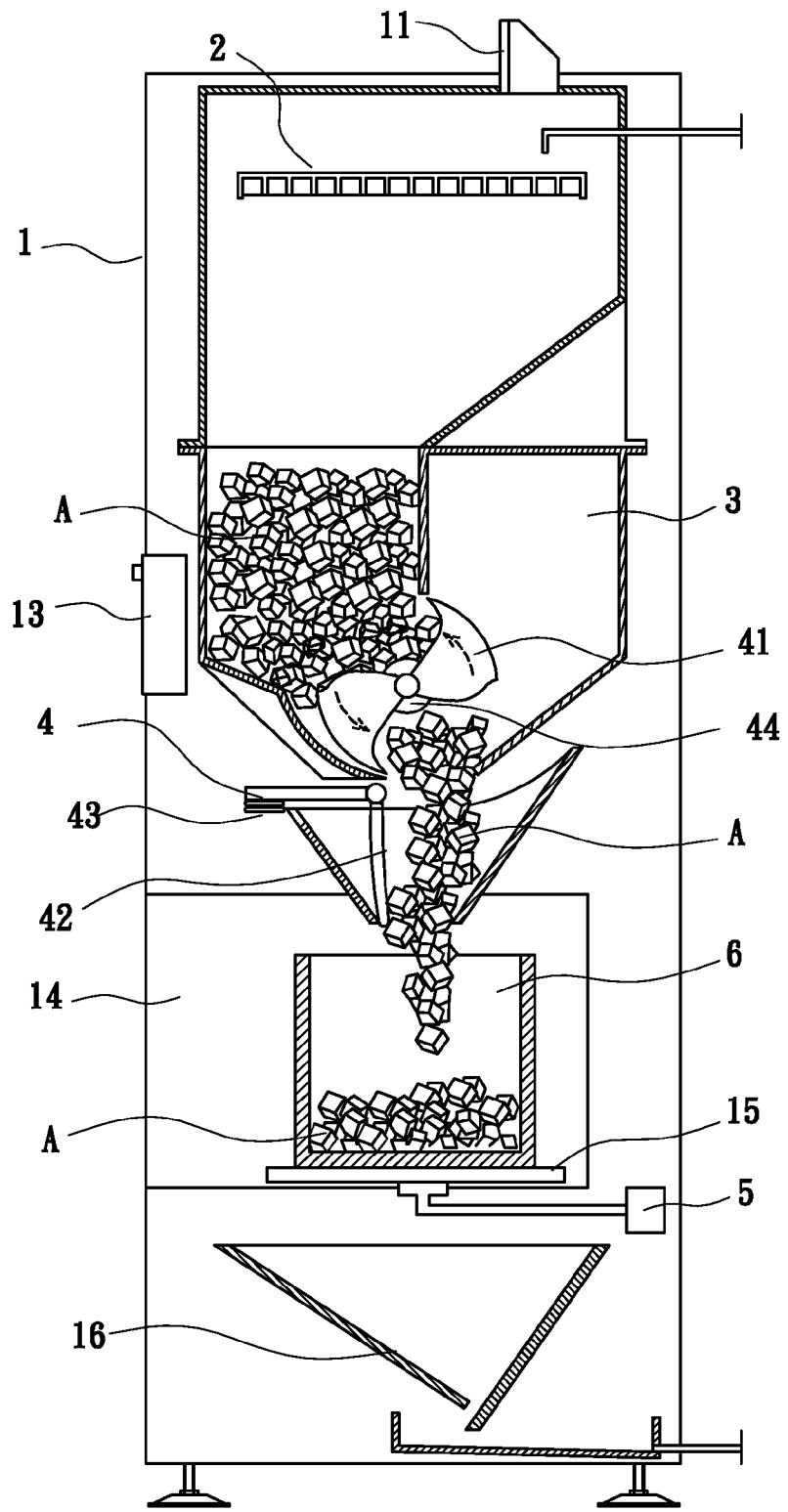
FIG. 5 is a schematic view of a third preferred embodiment of the invention.
Figure 6:
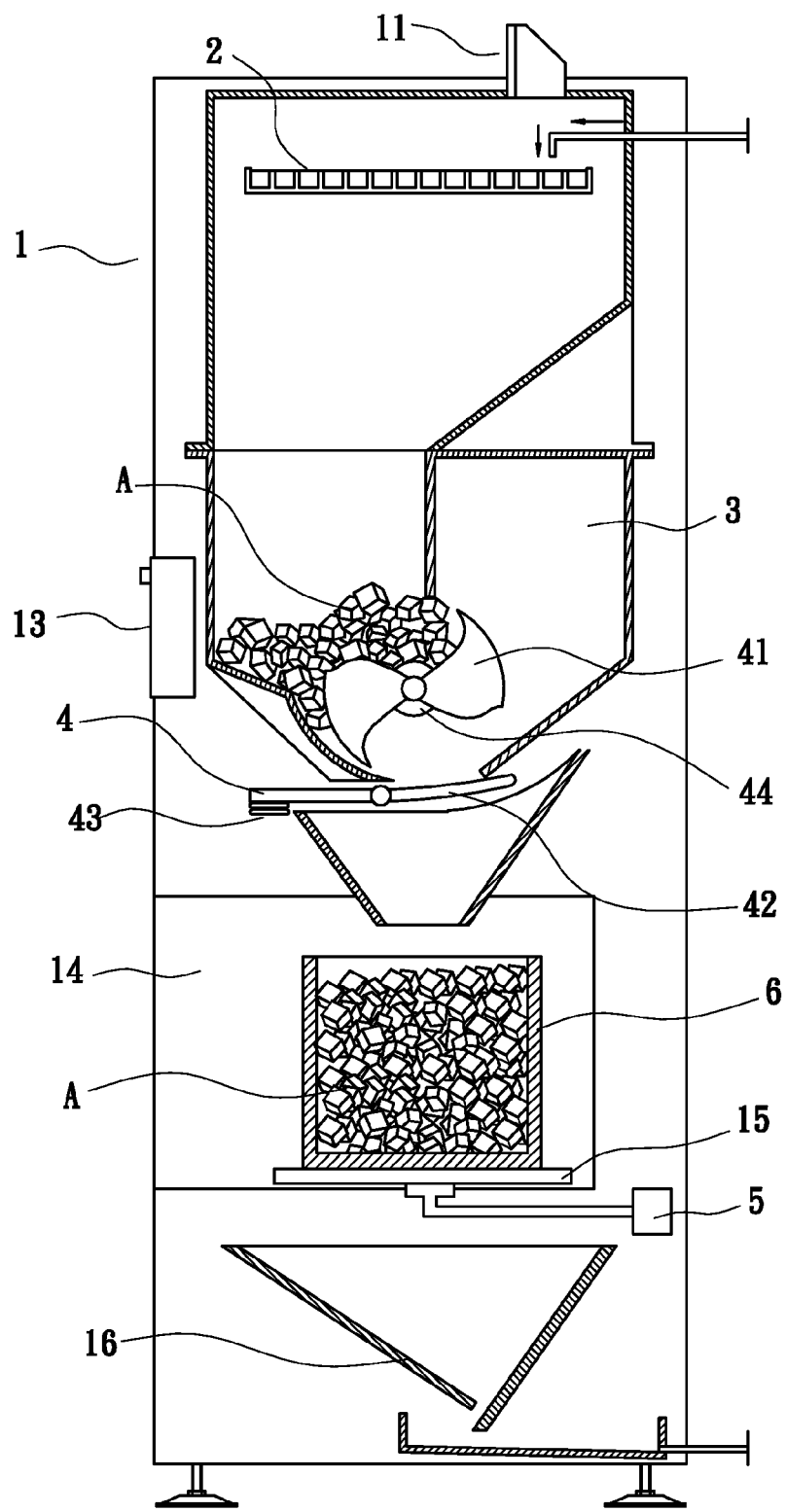
FIG. 6 is a schematic view of a fourth preferred embodiment of the invention.

After a user puts the container 6 on the weighing scale 15 at the outlet 14 of the machine body 1 and inserts coins into the vending machine according to the information displayed in the display screen 12, and a control loop installed in the machine body 1 detects the actual weight of the user's container 6 and calculates the weight of outputted ice cubes according to the inputted coins, the numerical result is inputted to the control loop for calculating the corresponding actual weight of ice cubes. In the meantime, the motor 44 is turned on to drive the vane roller 41 to rotate and push the ice cubes A gradually down to the catch plate 42 (as shown in FIG. 4). Until the weight of ice cubes A piled up on the catch plate 42 is greater than the weight block 43 on the other end, the catch plate 42 will be opened downward, such that the plurality of ice cubes A at the opening disposed at the bottom of the ice bucket 3 fall into container 6 (as shown in FIG. 5). Now, the vane roller 41 not only pushes the ice cubes A, but also compresses the ice cubes A to assure that the ice cubes A are separated from each other and prevent the plurality of ice cubes from being condensed into an aggregate of a large volume. The weight sensing module 5 at the bottom of the weighing scale 15 can detect the weight of the load. After the numerical result is calculated by the control loop, the vane roller 41 driven by the motor 44 will stop rotating, since the weight of ice cubes A outside the vane roller 41 is less than the weight of the weight block 43, or there is no ice cube A at all. Therefore, the catch plate 42 will close the opening at the bottom of the ice bucket 3 again (as shown in FIG. 6). In the meantime, the quantity of remained ice cubes in the machine body 1 is recorded automatically, such that the ice cubes can be produced again timely and automatically, and the supply of the ice cubes will be stopped temporarily.

Since the present invention encourages users to bring their own container 6 to contain the ice cubes outputted from the machine body 1 and also takes different weights of a user's container 6 into consideration, therefore the machine body 1 sets a weight of ice cubes corresponding to the dollar amount of the inputted coins and also adds the weight of a user's container 6 that the user brings at that particular time, such that the weight sensing module 5 disposed under the container 6 can reflect the actual weight of the load and match the numerical result calculated by the control loop. Thus, the invention can prevent unfair business transaction with less supply of ice cubes due to the different weights of the users' containers 6.

In summation of the description above, the present invention conforms with the situation of a user bringing a container and putting the container on the weighing scale of the weight sensing module at the outlet of the machine body, and then using the weight sensing module to calculate the total weight of the user's container and the supplied ice cubes, so as to achieve the expected effect of supplying ice cubes according to the dollar amount of the inputted coins. Obviously, the present application complies with the patent application requirements, and thus is duly filed for patent application.

What is claimed is:

1. A weighing type ice vending machine, comprising a heat dissipating opening disposed on an external surface of a machine body for discharging heat, a display screen installed at the front side of the machine body, a coin slot, an outlet for putting a container and allowing ice cubes to come out, a weighing scale installed at the bottom of the outlet, and the bottom of the weighing scale being coupled to a weight sensing module, and having an overflow water collecting tank, an ice cube formation device installed in the machine body and comprised of a storage bucket, an output device, a weight sensing module and a control loop, and pure water being put into an ice tray made of a metal and installed in the machine body to form a plurality of ice cubes, and the ice cubes being put into the storage bucket for a cold storage, and the ice bucket being made of a stainless steel and the circumferential surface of the external periphery of the ice bucket being wrapped by insulating materials including polylon, insulating foam material and aluminum foil layer, and an output device being disposed at an outlet of the storage bucket in the machine body, and comprised of a vane roller, a catch plate and a weight block, such that after the plurality of ice cubes produced in the machine body is put into the storage bucket for the cold storage, and a user puts a user's container on the weight sensing module at the outlet of the machine body, and the information of coins inputted by the user is displayed, the quantity of ice cubes corresponding to the dollar amount of the inputted coins is calculated and outputted automatically, and then the output of ice cubes is stopped, and the quantity of ice cubes remained in the machine body is recorded automatically, such that ice cubes are produced again timely and automatically, and the vending machine is closed for business temporarily, and the weight sensing module is provided for calculating the total weight of the container and a fixed quantity of ice cubes to achieve the effect of supplying ice cubes according to the dollar amount of the inputted coins.

2. The weighing type ice vending machine of claim 1, wherein the machine body has an output device installed at the position of an outlet of the storage bucket and formed by a vane roller, a catch plate and a weight block, and the catch plate and the weight block are disposed under the vane roller, and the vane roller is driven by a motor to rotate to move the ice cubes to the catch plate, and drop the ice cubes into the container if the weight of the catch plate is greater than the weight of the weight block at another end, and the catch plate is shut when the dropping of the ice cubes completes.

3. The weighing type ice vending machine of claim 2, wherein the vane roller of the output device disposed above the outlet of the storage bucket in the machine body not only pushes the ice cubes, but also compresses the ice cubes at the same time to assure that the ice cubes are separated from each other and prevent the plurality of ice cubes from being condensed into an aggregate of a large volume.

4. The weighing type ice vending machine of claim 1, wherein the weight sensing module disposed on the outlet of the machine body uses an electronic component for sensing weight.

5. The weighing type ice vending machine of claim 1, wherein the weight sensing module disposed on the outlet of the machine body uses a mechanical component for sensing weight.

* * * * *